US011758376B2

(12) United States Patent
Barrett et al.

(10) Patent No.: US 11,758,376 B2
(45) Date of Patent: Sep. 12, 2023

(54) METHOD AND SYSTEM FOR ADDITION OF ASSURANCE INFORMATION TO V2X MESSAGING

(71) Applicant: BlackBerry Limited, Waterloo (CA)

(72) Inventors: Stephen John Barrett, Haywards Heath (GB); Michaela Vanderveen, Tracy, CA (US)

(73) Assignee: BlackBerry Limited, Waterloo (CA)

( * ) Notice: Subject to any disclaimer, the term of this patent is extended or adjusted under 35 U.S.C. 154(b) by 333 days.

(21) Appl. No.: 16/861,870

(22) Filed: Apr. 29, 2020

(65) Prior Publication Data
US 2021/0345074 A1 Nov. 4, 2021

(51) Int. Cl.
*H04W 4/40* (2018.01)
*H04L 67/12* (2022.01)
*H04W 4/06* (2009.01)
*H04W 12/069* (2021.01)

(52) U.S. Cl.
CPC .............. *H04W 4/40* (2018.02); *H04L 67/12* (2013.01); *H04W 4/06* (2013.01); *H04W 12/069* (2021.01)

(58) Field of Classification Search
CPC ........ H04W 4/40; H04W 12/069; H04W 4/06
See application file for complete search history.

(56) References Cited

U.S. PATENT DOCUMENTS

| | | | |
|---|---|---|---|
| 2010/0201543 A1* | 8/2010 | Shorey | G08G 1/161 340/902 |
| 2013/0030657 A1* | 1/2013 | Chatterjee | B60W 30/00 701/46 |
| 2018/0322785 A1* | 11/2018 | Jerichow | G08G 1/162 |
| 2019/0364484 A1 | 11/2019 | Kim et al. | |
| 2020/0106624 A1 | 4/2020 | Russell et al. | |
| 2020/0162481 A1* | 5/2020 | Kunz | H04W 4/40 |
| 2021/0160323 A1* | 5/2021 | Nassor | G08G 1/093 |
| 2021/0314748 A1* | 10/2021 | Cominetti | H04L 9/3247 |
| 2021/0316755 A1* | 10/2021 | Liu | B60W 50/045 |

OTHER PUBLICATIONS

PCT International Search Report and Written Opinion, PCT/US2021/29703, dated Jul. 26, 2021.
IEEE 1609.2, "EEE Standard for WAVE—Security Services for Applications and Management Messages—Consolidated Draft of IEEE 1609.2-2016 with Amendments Specified in 1609.2a / D8 and 1609.2b / D3" Dec. 2016.
ETSI Technical Specification (TS) 103 097 "TS; Security; Security header and certificate formats" v1.3.1, Oct. 2017.

(Continued)

*Primary Examiner* — Edan Orgad
*Assistant Examiner* — Won Tae C Kim
(74) *Attorney, Agent, or Firm* — Moffat & Co

(57) ABSTRACT

A method at an Intelligent Transportation System (ITS) Entity, the method including receiving a message from a second ITS entity, the message containing a safety assurance indication, and performing an action at the ITS entity based on the safety assurance indication. Further, an ITS Entity comprising a processor; and a communications subsystem, wherein the ITS Entity is configured to: receive a message from a second ITS entity, the message containing a safety assurance indication, and perform an action at the ITS entity based on the safety assurance indication.

19 Claims, 8 Drawing Sheets

(56) References Cited

OTHER PUBLICATIONS

ETSI Technical Specification (TS) 102 941 "ITS; Security; Trust and Privacy Management", v1.2.1, May 2018.
ETSI Technical Specification (TS) 102 904 "Intelligent Transport Systems (ITS) Security, ITS Communications Security Architecture and Security Management", v. 1 2.1, Nov. 2016.
CAR2CAR Communication Consortium, "Protection profile V2X Hardware security module", Aug. 2018.
Preserve, "PREparing SEcuRe VEhicle-to-X Communication Systems Deliverable 5.4", Jan. 31, 2016.
Kastuv M. Tuladhar & Kiho Lim, "Efficient and Scalable Certificate Revocation List Distribution in Hierarchical VANETs", 2018 IEEE International Conference on Electro/Information Technology (EIT), IEEE, May 3, 2018, pp. 620-625, XP033423872, DOI: 10.1109/EIT.2018.8500150.
European Patent Office Extended European Search Report (EESR) for Application 21796007.9, dated Jul. 11, 2023.

\* cited by examiner

METHOD AND SYSTEM FOR ADDITION OF ASSURANCE INFORMATION TO V2X MESSAGING

FIELD OF THE DISCLOSURE

The present disclosure relates to Vehicle to Everything (V2X) communications, and in particular relates to trust for V2X messages.

BACKGROUND

Intelligent Transport Systems (ITS) are systems in which a plurality of devices communicate to allow for the transportation system to make better informed decisions with regard to transportation and traffic management, as well as allowing for safer and more coordinated decision-making. ITS system components may be provided within vehicles, as part of the fixed infrastructure, such as on bridges or at intersections, and for other users of the transportation systems including pedestrians or bicyclists.

ITS system deployment is receiving significant focus in many markets around the world, with radiofrequency bands being allocated for the communications. In addition to the vehicle to vehicle communications for safety critical and non-critical applications, further enhancements to provide for traffic safety and efficiency are being developed for vehicle to infrastructure and vehicle to portable scenarios.

However, when such devices communicate, a receiving device needs to be confident that the message received is trustworthy in order to act on the information within such message. One aspect of the problem that a receiving device faces in determining trustworthiness is whether the sending entity is operating correctly, in other words that it is not faulty. Another aspect of the problem that a receiving device faces in determining trustworthiness is whether the sending entity is behaving as intended.

BRIEF DESCRIPTION OF THE DRAWINGS

The present disclosure will be better understood with reference to the drawings, in which.

DETAILED DESCRIPTION OF THE DRAWINGS

Figure 1:
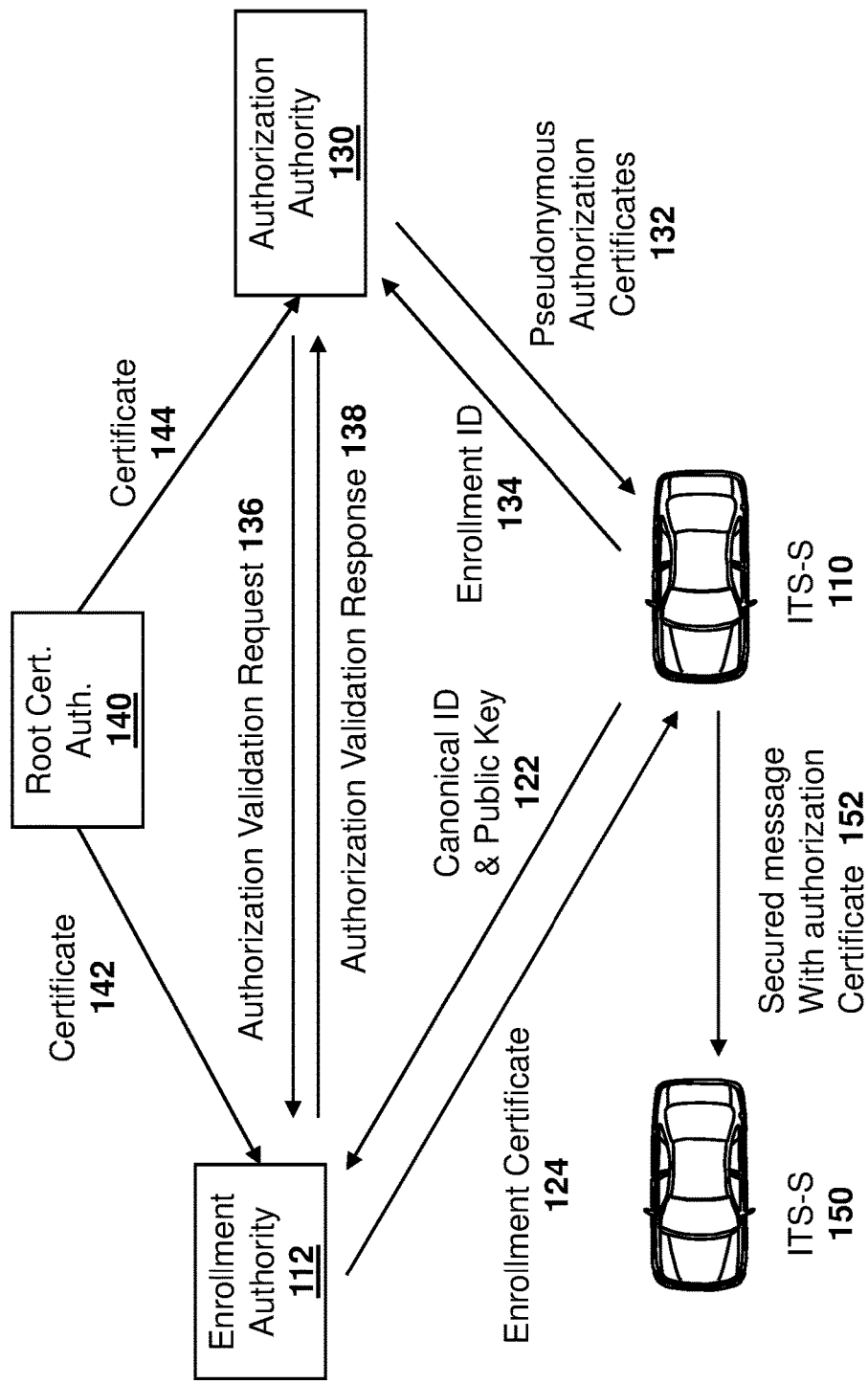
FIG. 1 is a block diagram showing an example public key infrastructure architecture for certificates in a V2X system.

The present disclosure provides a method at an Intelligent Transportation System (ITS) Entity, the method comprising: receiving a message from a second ITS entity, the message containing a safety assurance indication, and performing an action at the ITS entity based on the safety assurance indication.

The present disclosure further provides an Intelligent Transportation System (ITS) Entity, the ITS Entity comprising: a processor; and a communications subsystem, wherein the ITS Entity is configured to: receive a message from a second ITS entity, the message containing a safety assurance indication, and perform an action at the ITS entity based on the safety assurance indication.

The present disclosure further provides a computer readable medium for storing instruction code, which, when executed by a processor of an Intelligent Transportation System (ITS) Entity, cause the ITS Entity to: receive a message from a second ITS entity, the message containing a safety assurance indication, and perform an action at the ITS entity based on the safety assurance indication.

In determining whether to act on a received V2X message, a V2X entity such as a vehicle receiving that message may need to determine whether or not it can trust the message. Trust of a message may vary based on the type of message. For example, safety critical use cases, such as an Emergency Brake Warning, where a receiving vehicle may need to determine whether or not it should act on the message contents and apply its brakes hard, possibly even in the absence of other corroborating information, may need a higher level of trust. For example, a large truck may be between the vehicle sending the message and the vehicle receiving the message, thus eliminating any line of sight corroborating information.

Various aspects of the problem that a receiving V2X entity faces in determining trustworthiness of the sending V2X entity exist. A first aspect is whether the receiving entity can be confident that the transmitting entity is cybersecure and has not been, or is unlikely to have been, hacked.

A second aspect is whether the receiving entity can be confident that the V2X transmitting entity is not faulty and has therefore not generated message erroneously or with erroneous content.

A third aspect is whether the receiving entity can be confident that the V2X transmitting entity is operating as intended. In this third aspect, the receiving entity may need to determine whether it is confident that there are no inadequacies in the design of complex perception algorithms at the transmitting entity, or in the performance and operation of sensors that could result in a message being generated erroneously or with erroneous content.

Currently, no solution exists by which the V2X receiving entity can establish trust that the V2X message has been generated by a transmitter which is not faulty.

Further, no solution exists by which the V2X receiving entity can establish that functional safety exists for the Safety Of The Intended Functionality (SOTIF). Specifically, the V2X receiving entity may need to know that the V2X transmitting entity will not generate a message or message content either inappropriately or inaccurately based on failures of the intended functionality. A V2X message may be generated based on perception algorithms such as Artificial Intelligent (AI) or Machine Learning (ML) algorithms. However, the process of ensuring that such AI/ML perception algorithms will always behave as intended is difficult. For example, it is difficult to be completely confident that the type and quantity of data used in training the AI/ML models was sufficient to cover all scenarios that the perception algorithms might encounter in the field. ISO 21448 provides answers to this type of question, in terms of the set of procedures and processes that should be followed by a manufacturer in order for a product to be deemed 'accepted for release' from a SOTIF viewpoint.

Still further, a different set of Electronic Control Units (ECUs) may be involved in generating the messages associated with different use cases. For example, one V2X message, such as an Emergency Brake Warning, may involve taking sensor information from the braking system, whereas other V2X messages, such as a regular periodic Cooperative Awareness Message (CAM) or Basic Safety Message (BSM) may not. Manufacturers may wish to avoid having to design every ECU with the cybersecurity, functional safety or SOTIF assurance level of the most demanding V2X application, as this would be unnecessarily expensive. Thus, in some cases it can be advantageous to determine trustworthiness according to the particular application type that is relevant to the given V2X message. Specifically, current standardization related to cybersecurity assurance enables a V2X transmitter to indicate a cybersecurity assurance level (TAL) level per application type (PSID), but the standards do not support assurance level to be signaled where there are multiple modes of operation within an application type.

Still further, one issue with adding distinguishing information to a vehicle's certificate, including a Functional Safety (FuSa) level, SOTIF level, among others, is that the information could be used to assist someone who may wish to track a vehicle. This will particularly be the case where different vehicles have different, though fixed, settings. This could potentially reduce the privacy of the owner or driver of the vehicle that is transmitting the V2X messages.

The embodiments of the present disclosure address one or more of the above issues.

The present disclosure is related to V2X, which is a feature that provides for communication of information from a vehicle to other entities (and possibly also vice versa) that may affect the vehicle and/or the other entities. A V2X Entity is therefore an entity that supports one or both of sending V2X messages and receiving V2X messages, and can include Intelligent Transportation System (ITS) Stations (ITS-S), Electronic Control Units (ECUs), On-Board Units (OBUs), a User Equipment (UE), a Mobile Entity (ME), an End Entity (EE), among other options. A V2X Entity is also referred to as an ITS Entity herein, and the terms may be used interchangeably.

Communications to or from the vehicle may be to various V2X endpoints. A V2X endpoint may include: other vehicles, which alone may be referred to as Vehicle-to-Vehicle (V2V); infrastructure such as road-side units, which alone may be referred to as Vehicle-to-Infrastructure (V2I); pedestrians or cyclists, which alone may be referred to as Vehicle-to-Pedestrian (V2P); network(s), which alone may be referred to as Vehicle-to-Network (V2N); devices such as electronic devices within the vehicle, which alone may be referred to as Vehicle-to-Device (V2D); the electricity grid, which alone may be referred to as Vehicle-to-Grid (V2G); among other options. Together these are referred to as V2X.

V2X communications can be used for a variety of uses. In some cases, V2X may be used for both road safety and for improving efficiency of road transport, such as by reducing congestion or reducing fuel consumption.

Various systems/architectures can provide V2X communication. Cellular networks, such as those defined in the Third Generation Partnership Project (3GPP) set of specifications, is one such system/architecture. Other systems/architectures could include, for example, an Integrated Digital Enhanced Network (iDEN), the Institute of Electrical and Electronic Engineers (IEEE) 802.11p based wireless networks, among other options.

Various standards currently exist for conveying a cybersecurity assurance level in V2V messages. These include the European Telecommunications Standards Institute (ETSI), the Institute of Electrical and Electronics Engineers (IEEE) 1609.2, "IEEE Standard for WAVE—Security Services for Applications and *Management Messages—Consolidated Draft of IEEE* 1609.2-2016 *with Amendments Specified in* 1609.2a/D8 *and* 1609.2b/D3", December 2016, and the Car2Car consortium.

Generally, V2X communications consist of V2X messages sent from and received by V2X Entities. V2X messages are broadcast messages containing, for example, information about a vehicle's current position, speed, or other information, and are signed by temporary keys, associated with pseudonymous certificates belonging to the sending entity. The certificate is sent in full or a hash of it is sent along with the message. Receiving entities that are able to detect and decode these messages are able to verify the certificate used to sign it. The cybersecurity assurance level can be included in these certificates.

For example, in the European ITS system, ETSI Technical Specification (TS) 103 097 "ITS; Security; Security header and certificate formats" v1.3.1, October 2017 and ETSI TS 102 941 "ITS; Security; Trust and Privacy Management", v1.2.1, May 2018, provide for such verification. In this European ITS system, at the time of manufacture of an ITS Station (ITS-S) a canonical globally unique identifier is provided in the ITS-S, and the same identifier is provided in an Enrollment Authority alongside other information that is relevant to that identifier, including assurance level and ITS Application Identifiers (ITS-AIDs). Further, Service Specific Permissions (SSPs) detailing the applications, or features with an application that the vehicle is allowed to use when creating and sending messages may also be provided.

Reference is now made to FIG. 1, which provides an example overview of a European Telecommunications Standards Institute (ETSI) ITS Public Key Infrastructure, as for example defined in ETSI Technical Standard (TS) 102 904, "*Intelligent Transport Systems (ITS) Security, ITS Communications Security Architecture and Security Management*", v. 1.2.1, November 2016.

In the example of FIG. 1, at the time of manufacture, a canonical identifier (ID), which is a an ID unique to each V2X Entity in a V2X system, is provided to the V2X Entity (e.g. ITS-S 110), and the same canonical ID is provided to the Enrollment Authority 112 alongside other information that is relevant to that canonical ID, such as an assurance level.

In the ITS architecture, an Enrollment Authority 112 authenticates an ITS-S 110 once it receives the Canonical ID and possibly other data (for example, a Public Key) 122 and grants it authorization to engage in ITS communications by issuing an Enrollment Certificate 124. An Authorization Authority 130 (also called an Authorization Certificate Authority in US System (or IEEE described systems)) provides an ITS-S 110 with authorization to use specific ITS services by providing temporary/pseudonym certificates 132 (known also as Authorization Tickets or Authorization Certificates) that can be used for these services. This authorization is based on the Enrollment ID 134, which is validated by the Enrollment Authority 112 using an Authorization Validation Request 136 and Authorization Validation Response 138.

A Root Certificate Authority 140 may provide certificates 142 to Enrollment Authority 112 and certificates 144 to Authorization Authority 130.

ITS-S 110 may then communicate with other V2X endpoints, such as ITS-S 150, using messages secured with the authorization certificate 152.

Figure 2:
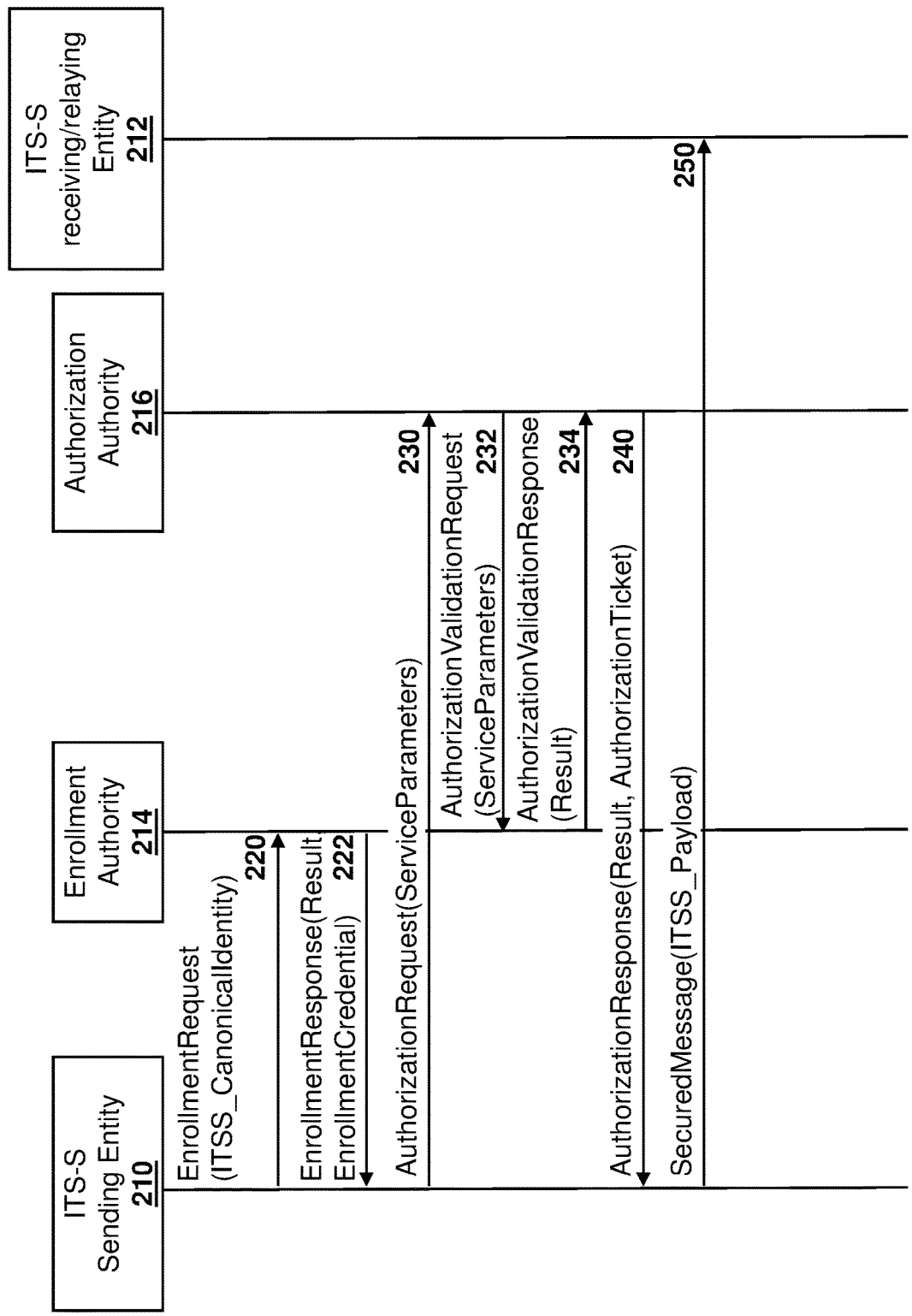
FIG. 2 is a dataflow diagram showing a certificate retrieval and V2X communication process in a V2X architecture.

An example for the messaging for the certificates is described with regards to FIG. 2. In the embodiment of FIG. 2, an ITS-S Sending Entity 210 wants to communicate with an ITS-S Receiving or Relaying Entity 212. First however, an enrollment credential must be received from an Enrollment Authority 214 and authorization ticket/certificate received from an Authorization Authority 216.

In this regard, the ITS-S Sending Entity 210 sends an EnrollmentRequest message 220 to the Enrollment Authority 214 and includes its Canonical ID and public key.

The Enrollment Authority 214 responds to the ITS-S Sending Entity 210 with an EnrollmentResponse message 222 and includes a result and enrollment credential.

The ITS-S Sending Entity 210 then requests certificates/Authorization tickets by sending an AuthorizationRequest message 230 to the Authorization Authority 216. Message 230 includes service parameters.

The Authorization Authority 216 sends an AuthorizationValidationRequest message 232 including the service parameters to the Enrollment Authority 214. The Enrollment Authority 214 responds to the Authorization Authority 216 with an AuthorizationValidationResponse message 234 with a result. Message 234 may further include an Assurance Level that applies. The Authorization Authority 216 may include the Assurance Level, if received, in the Authorization Tickets (also known as Pseudonym Certificates or Authorization Certificates) that it produces. As used herein, Authorization Tickets could include the European Authorization Tickets or US Authorization Certificates, previously known as Pseudonym certificates.

These Authorization Tickets are provided by the Authorization Authority 216 to the ITS-S Sending Entity 210 in the Authorization Response message 240.

The ITS-S Sending Entity 210 can then send a V2X message, shown as SecuredMessage 250, to another ITS-S in the Intelligent Transportation System, such as ITS-S Receiving or Relaying Entity 212. The ITS-S Sending Entity 210, when wishing to send a V2X message, typically creates a V2X message that includes a certificate (Authorization Ticket) and a payload (e.g. vehicle current position, speed); computes a fixed length hash of the variable length V2X message, using a well-known hashing algorithm; signs the hash, using the ITS-S Sending Entity's private key; and appends the signature to the payload and sends the resulting V2X message.

Thus, the V2X message contains the message contents, a signed hash of the message, and a certificate. The message contents may, in accordance with ETSI TS 102 940, be protected for authenticity and integrity, and confidentiality and privacy. Therefore, the payload may, but need not, be encrypted.

The certificate may include, amongst other things, the sending entity's public key; the sending entity's pseudonymous identity; a signature block which is a hash of the sending entity's identity and the sending entity's public key which is signed by the Certificate Authority using the Certificate Authority's private key; the identity of the certificate authority which has signed the certificate; and an assurance level of the sending V2X Entity.

On receiving message 250, the ITS-S Receiving or Relaying Entity 212 will typically apply the Certificate Authority's well-known public key to the certificate's signature block to verify the identity of the sending entity and the public key of the sending entity.

The ITS-S Receiving or Relaying Entity 212 may then check that the identity is not on the list of identities (pointed to) in a Certificate Revocation List (CRL). If the sending entity's identity is on the CRL then the message may be discarded. The ITS-S Receiving or Relaying Entity 212 may perform other plausibility (non-cryptographic) checks and validity (cryptographic) checks.

The ITS-S Receiving or Relaying Entity 212 may then use the public key of the sending entity to verify the signature included in the V2X message.

While the above describes receiving V2X messages that are validated by a certificate, in some cases a Cybersecurity Assurance Level needs to also be conveyed. Various solutions for providing a Cybersecurity Assurance level are, for example, described in IEEE 1609.2; ETSI, the Internet Engineering Task Force (IETF) and the Car2Car consortium.

Specifically, the process defined in IEEE 1609.2 of obtaining an Enrollment certificate and then Application certificates (similar to "Authorization Tickets" and previously known as "pseudonym certs") is similar to that described in ETSI TS 103 097. An "assuranceLevel" item can be included in the IEEE 1609.2 certificate that is sent with the V2X message, where that certificate's corresponding private key is used to sign the V2X message.

For example, IEEE 1609.2 defines a ToBeSignedCertificate as including various fields such as the Id, cracaID, region, and assuranceLevel, among other fields. The assuranceLevel has a value defined as SubjectAssurance and is optional.

Further, a design for receiving Secure Data Exchange Entity (SDEE) information may also specify a minimum assurance level for particular signed Secured Protocol Data Unit (SPDU) payloads based on the assuranceLevel field in the certificate. In this case, the receiving SDEE may check that the assuranceLevel in the certificate is appropriate for the received payload. This is, for example, outlined in IEEE 1609.2, section 5.2.4.3.3.

IETF, in a document entitled draft-tls-certieee1609-02.txt, "*Transport Layer Security (TLS) Authentication using ITS ETSI and IEEE certificates*", March 2018, considered a Trust Assurance Level (mandatory). Specifically, this draft stated: Trust Assurance Level (TAL): The C-ITS certificates of CAs and end-entities must contain a TAL: (1) For the security of a V2X communication system, assurance about the in-vehicle security of participants is vital: the receiver of a message has to be able to rely on the fact that the sender has generated the message correctly (i.e. the car sensors information is accurate and of integrity). Hence, a security breach on the sender would have an impact on all the receivers of a message; and (2) Only vehicles with a reasonable "level of security" should be able to obtain certificates from the PKI. The Car-to-Car Communication Consortium (C2C-CC) introduced different levels of trust, defined as Trust Assurance Levels and the authorization tickets (i.e. pseudonym certificates) of the vehicle must include the value of the vehicle TAL. Subsequent drafts do not contain this requirement.

The Car2Car consortium defines an Evaluation Assurance Level (EAL4) Common Criteria protection profile for the V2X Hardware Security Module (HSM) in Car2Car communication consortium, "Protection profile V2X Hardware security module", August 2018. Section 7.4.6 of the Car2Car consortium Basic Profile, "C2C-CC Basic System profile", August 2016, describes trust assurance for C2X stations. Highlights include that 5 trust levels are specified as Trust dealt more with use of cryptography rather than a full-blown cybersecurity standard; ISO Common Criteria 3.1, which has limited durability (2 years), causing a problem and also being costly; and the CC adapted custom OEM C2X evaluation scheme. Also, the ISO/SAE 21434 Draft International Standard "Road vehicles—Cybersecurity engineering", February 2020, did not exist in 2012, but is described below.

An example of Trust Assurance Levels as defined by the C2C forum is shown in Table 1 below.

TABLE 1

Trust Assurance Levels for C2X Stations

| Trust ass. level TAL | Minimum Target of Evaluation (TOE) | Minimum Evaluation Assurance Level (EAL) | (Hardware) Security Functionality | Prevented Attacker acc. to CC | Security Implications | C2X use Case Examples |
|---|---|---|---|---|---|---|
| 0 | None | None | None | None | Not reliable against security attacks in general | Some limited e.g. using trusted C2I infrastructure |
| 1 | +C2X box software | EAL 3 | Only software security mechanisms | Basic | Not reliable against simple hardware attacks (e.g. offline flash manipulation) | Non-safety, but most privacy relevant use cases |
| 2 | +C2X box (sec.) hardware | EAL 4 | +Dedicated hardware security (i.e. secure memory & processing); tamper evidence | Enhanced Basic | Not reliable against more sophisticated hardware attacks (e.g. side-channel attacks) | C2C-CC day one use cases (e.g. passive warnings and helpers) |
| 3 | +tamper-protected (sec.) hardware | EAL 4+ (AVA_VAN.4 vulnerability resistance) | +Basic tamper resistance | Moderate | C2X box secure as stand-alone device, but without trustworthy in-vehicle inputs | Safety relevant relying not only on V2X inputs |
| 4 | +relevant in-vehicle sensors and ECUs | EAL 4+ (AVA_VAN.5 vulnerability resistance) | +moderate-high tamper resistance | Moderate-High | C2X box is trustworthy also regarding all relevant in-vehicle inputs. | All |

Assurance Level (TAL) 0 through TAL 4, where TAL 4 is highest Trust Assurance Level. A Minimal acceptable TAL for an ITS station is TAL 2. Each TAL is mapped to a Subject Assurance representation according to ETSI TS 103 097.

Further, a 2012 presentation at a Car2Car consortium/CAMP meeting had the following highlights: a receiver can be sure that the V2X message is not faulty based on the notion that a trusted party has evaluated the sending endpoint according to a well proven internationally accepted and trusted security standard and issues a certificate the receiver can verify about its opinion on how difficult it is to compromise this sender. The meeting further suggested that different TALs could be used for different applications, since if there is just one TAL level, it would have to be the one required by the most demanding application. This level may be a difficult level to achieve level for all applications.

The Car2Car meeting considered options for a 'trusted international standard', including NIST FIPS-140-X, which In Table 1 above, TAL 2 is the minimum acceptable level.

Another example of an assurance level is with regard to PRESERVE. PRESERVE is a European Community funded project on security and privacy aspects of vehicle to everything communications. Highlights from Section 2.5 of 'PRESERVE' (7th framework program funded by the EC-DG INFSO), January 2016, 'Preparing Secure Vehicle to X communication systems', Deliverable 5.4, Deployment Issues report, includes that: only vehicles with a reasonable level of security should be able to receive certificates from the C2X PKI; an entity (e.g. certification type company/industry consortium/self-signing by OEM) should be able to verify that a V2X module has met a minimum-security level; successful evaluation and certification could be the basis for an Enrollment Authority to issue enrollment credentials to vehicles; and TALs should be included in the authorization tickets (pseudonym certs) of vehicles.

PSID and SSP of the IEEE 1609.2 Certificate

A Public Service Identifier (PSID) is similar to and ETSI ITS-AID, and provides an identifier of an application area. SSP and PSID are standardized in IEEE 1609.2 and provide the following.

Application permissions are defined as the actions a certificate holder is allowed to take as stated in their certificate. Such application permissions are expressed in the standard using the PSIDs.

SSPs, as indicated above, are Service Specific Permissions and consist of a field that indicates the permissions of a particular certificate holder with respect to a particular application area.

Using these definitions, PSIDs are used in certificates to specify permitted application areas. An SSP is provided either implicitly or explicitly for each PSID in the application permissions, identifying specific sender permissions within that PSID's application area. The syntax and semantics of the SSP are specific to each PSID value.

For example, Table 1 shows the PsidSsp definition as provided in section 6.4.24 of the IEEE 1609.2 standard.

TABLE 2

PsidSsp format

```
PsidSsp ::= SEQUENCE {
  psid                  ,
  ssp                   ServiceSpecificPermissions OPTIONAL
}
SequenceOfPsidSsp ::= SEQUENCE OF PsidSsp
```

The structure of Table 2 represents the permissions that a certificate holder has with respect to data for a single application area, identified by a Psid. If the ServiceSpecificPermissions field is omitted, it indicates that the certificate holder has the default permissions associated with that PSID.

With regards to SSPs, as discussed in section 5.2.4.3.3 of IEEE 1609.2, the certificate provides two fields that are used to determine that the payload of a single SPDU is consistent with the permissions of the sender. The PSID field indicates that the sender is entitled to send payloads associated with the application area indicated by the PSID field. The SSP field indicates that the sender has permissions to send specific payload types within that application area. The definition of application behavior within the application area includes the mapping from payload contents to the permissions (PSID and SSP) that define the validity of the payload. In other words, one of the responsibilities of the PSID owner is to define the syntax and semantics of the SSP and to define which payloads are permitted by specific SSPs.

The PSID, SSP and assurance level are contained within the certificate specified in section 6.4.8 of IEEE 1609.2. The certificate format supports inclusion of multiple (PSID, SSP) pairs, but no PSID appears more than once in a valid certificate, so the correct PSID can be an ambiguously associated with a signed SPDU.

Privacy

One principle within the Intelligent Transportation System is that the privacy of the transmitting entity should be respected. However, utilization of an SSP to convey a transmitting vehicle's capability may cause privacy to be reduced, since such a special SSP will be different from the SSP of other transmitting entities in the vicinity. In general, any distinguishing feature in the pseudonym temporary certificate reduces privacy.

As described in more detail below, in order to overcome this, in some cases a transmitting entity could have a plurality of certificates associated with it. In particular, a transmitting entity could have a "ordinary" certificate without any special permissions, and another certificate with the SSP set for advanced capabilities. In this case, the transmitting entity would only use the SSP certificate when the message warranted it, and use the ordinary certificate everywhere else.

Providing an Indication of Functional Safety and/or SOTIF Assurance Levels

Therefore, in accordance with the present disclosure, various solutions are provided to allow for the establishment of trust that a V2X message has been generated by a transmitter which is not faulty. Further, the embodiments described also provide for assurance of functional safety for SOTIF. In various embodiments herein, the solution may be tailored based on the function of the ECU.

These and other embodiments are described below. In the embodiments below, the examples are described in terms of the European Cooperative Credential Management System (CCMS). However, this is merely provided for illustration purposes and is not limiting. Similar concepts can be applied to any other types of Security Credential Management System (SCMS), including but not limited to the US Crash Avoidance Metrics Partners (CAMP) based SCMS system, the Chinese SCMS system, among other options.

Figure 3:
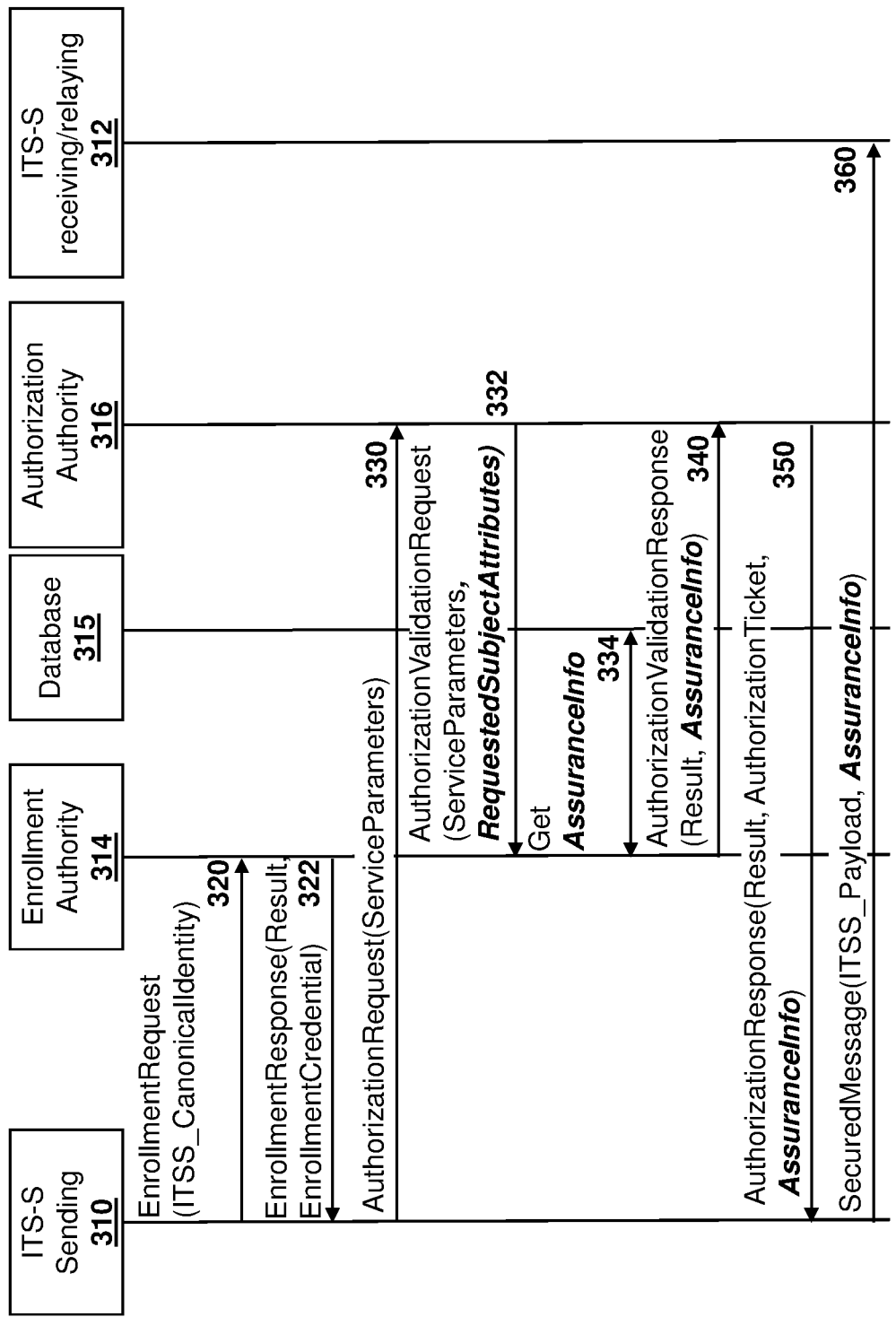
FIG. 3 is a dataflow diagram showing a certificate retrieval and V2X communication process in a V2X architecture having additional assurance information.

An example for the indication of Functional Safety and/or SOTIF Assurance Levels is described with regards to FIG. 3. In the embodiment of FIG. 3, an ITS-S Sending Entity 310 wants to communicate with an ITS-S Receiving or Relaying Entity 312. First however, an enrollment credential must be received from an Enrollment Authority 314 and authorization ticket received from an Authorization Authority 316. Further, in the embodiment of FIG. 3, a database 315 may store a verified assurance level for an entity.

In this regard, the ITS-S Sending Entity 310 sends an EnrollmentRequest message 320 to the Enrollment Authority 314 and includes its Canonical ID and public key.

The Enrollment Authority 314 responds to the ITS-S Sending Entity 310 with an EnrollmentResponse message 322 and includes a result and enrollment credential.

The ITS-S Sending Entity 310 then requests certificates/Authorization tickets by sending an AuthorizationRequest message 330 to the Authorization Authority 316. Message 330 includes service parameters.

The Authorization Authority 316 sends an AuthorizationValidation Request message 332 including the service parameters to the Enrollment Authority 314. In one embodiment, the Authorization Authority 316 could request that the Enrollment Authority 314 provide new parameters utilizing an update to the RequestedSubjectAttributes field in the AuthorizationValidation Request message 332. In particular, new parameters, defined herein as fusaAssuranceLevel and/or sotifAssuranceLevel are provided. These assurance levels are described below. Therefore, the RequestedSubjectAttributes within message 332 could request the fusaAssuranceLevel and/or sotifAssuranceLevel. However, the request for the fusaAssuranceLevel and/or sotifAssuranceLevel is optional in message 332, and in some cases the Enrollment Authority 314 may provide these parameters without being requested.

At some point, either after receiving message 332, or in anticipation of receiving an authorization request for a particular entity, the Enrollment Authority 314 may get AssuranceInfo from database 315, shown with messaging 334. As used herein, AssuranceInfo is used to signify the fusaAssuranceLevel and/or sotifAssuranceLevel.

In particular, policy and governance documents, such as the "Certificate policy for deployment and operation of European Cooperative Intelligent Transport Systems (C-ITS)", Release 1, European Commission, June 2017, may need to be updated to define new requirements to be performed by a Certificate Authority. Added requirements would include that the Certificate Authority may need to determine whether there is evidence from some independent third party that the Original Equipment Manufacturer's stated assurance level associated with a given canonical identity has in fact been achieved. The stated assurance level could deal with one or more of cybersecurity, functional safety and/or SOTIF. Further, optionally, the stated assurance levels could additionally be associated with a given V2X application type such as the PSID.

This verified assurance level would be recorded in database 315 that is accessible to the Enrollment Authority 314.

The Enrollment Authority 312 responds to the Authorization Authority 316 with an AuthorizationValidationResponse message 340 with a result. Message 340 may further include an Assurance Level that applies. The Authorization Authority 316 may include the Assurance Level, if received, in the Authorization Tickets (also known as Pseudonym Certificates) that it produces. Further, alongside the current assurance level parameter, the new parameters fusaAssuranceLevel and/or sotifAssuranceLevel could be provided, denoted in FIG. 3 as AssuranceInfo. All of the above, including cybersecurity assurance level could optionally be provided as a function of application type denoted by PSID, and optionally SSP as well.

These Authorization Tickets are provided by the Authorization Authority 316 to the ITS-S Sending Entity 310 in the Authorization Response message 350. In particular, message 350 includes Authorization Tickets that will be updated to include, alongside the current assuranceLevel parameter, the fusaAssuranceLevel and/or sotifAssuranceLevel.

In particular, the makeup of the current Authorization Ticket is as provided in Table 3 below:

TABLE 3

Authorization Ticket

```
ToBeSignedCertificate ::= SEQUENCE {
    id                      CertificateId,
    cracaId                 HashedId3,
    crlSeries               ,
    validityPeriod          ,
    region                  GeographicRegion OPTIONAL,
    assuranceLevel          SubjectAssurance OPTIONAL,
    appPermissions          SequenceOfPsidSsp OPTIONAL,
    certIssuePermissions        SequenceOfPsidGroupPermissions
                                OPTIONAL,
    certRequestPermissions      SequenceOfPsidGroupPermissions
                                OPTIONAL,
    canRequestRollover      NULL OPTIONAL,
    encryptionKey           PublicEncryptionKey OPTIONAL,
    verifyKeyIndicator      VerificationKeyIndicator,
    ...
}
```

TABLE 3-continued

Authorization Ticket

```
(WITH COMPONENTS { ..., appPermissions PRESENT} |
 WITH COMPONENTS { ..., certIssuePermissions PRESENT} |
 WITH COMPONENTS { ..., certRequestPermissions PRESENT})
```

In a first embodiment, the Authorization Ticket could be modified as shown in bold in accordance with Table 4 below:

TABLE 4

Modified Authorization Ticket

```
ToBeSignedCertificate ::= SEQUENCE {
    id                      CertificateId,
    cracaId                 HashedId3,
    crlSeries               ,
    validityPeriod          ,
    region                  GeographicRegion OPTIONAL,
    assuranceLevel          SubjectAssurance OPTIONAL,
    fusaAssuranceLevel          SubjectFusaAssuance OPTIONAL,
    sotifAssuranceLevel         SubjectSotifAssurance OPTIONAL,
    appPermissions          SequenceOfPsidSsp OPTIONAL,
    certIssuePermissions        SequenceOfPsidGroupPermissions
                                OPTIONAL,
    certRequestPermissions          SequenceOfPsidGroupPermissions
                                    OPTIONAL,
    canRequestRollover      NULL OPTIONAL,
    encryptionKey           PublicEncryptionKey OPTIONAL,
    verifyKeyIndicator      VerificationKeyIndicator,
    ...
}
(WITH COMPONENTS { ..., appPermissions PRESENT} |
 WITH COMPONENTS { ..., certIssuePermissions PRESENT} |
 WITH COMPONENTS { ..., certRequestPermissions PRESENT})
```

In accordance with one embodiment of the present disclosure, SubjectFusaAssurance could take one of four values corresponding to the Automotive Safety Integrity Level (ASIL) A, B, C or D, as for example defined in the International standards organization (ISO) 26262. However, other options for SubjectFusaAssurance are possible.

In accordance with one embodiment of the present disclosure, SubjectSotifAssurance could take one of two levels (BOOLEAN) corresponding to 'proof of SOTIF acceptance for release' or 'no proof of SOTIF acceptance for release'. However, other options for SubjectSotifAssurance are possible.

Further, in some cases, in order to avoid confusion, the current 'assuranceLevel' might be re-labelled to something like 'cybersecurityAssuranceLevl' or something similar.

In other embodiments, in order to additionally address the provision of the assurance level per application type/service type, the certificate format for the Authorization Ticket could be modified as shown in bold and strikethrough in Table 5 below:

TABLE 5

Modified Authorization Ticket

```
ToBeSignedCertificate ::= SEQUENCE {
    id                          CertificateId,
    cracaId                     HashedId3,
    crlSeries                   ,
    validityPeriod              ,
    region                      GeographicRegion OPTIONAL,
    assurance Level             Subject Assurance OPTIONAL ,
    appPermissionsAndAssurance         SequenceOfPsidSspAssurance
        OPTIONAL,
    certIssuePermissions        SequenceOfPsidGroupPermissions OPTIONAL,
    certRequestPermissions         SequenceOfPsidGroupPermissions OPTIONAL,
    canRequestRollover          NULL OPTIONAL,
    encryptionKey               PublicEncryptionKey OPTIONAL,
    verifyKeyIndicator          VerificationKeyIndicator,
    ...
}
...
PsidSspAssurance ::= SEQUENCE {
    psid                        Psid,
    ssp
    ServiceSpecificPermissions          OPTIONAL
    cybersecurityAssuranceLevel         SubjectAssurance OPTIONAL,
    fusaAssuranceLevel                  SubjectFusaAssurance OPTIONAL,
    sotifAssuranceLevel                 SubjectSotifAssurance OPTIONAL,
}
SequenceOfPsidSspAssurance ::= SEQUENCE OF PsidSspAssurance
```
This structure represents the permissions and assurances that the certificate holder has for a single application area, identified by a PSID and optionally SSP. If the ServiceSpecificPermissions field is omitted it indicates that the certificate holder has the default permissions associated with that Psid.

Therefore, by using the structure of Table 5, the assurance level for each application type or service type may be specified.

In yet a further embodiment, it may be desirable to avoid having to design every ECU with the cybersecurity, functional safety or SOTIF assurance levels of the most demanding V2X application, since this would be unnecessarily expensive. Therefore, in some cases, it may be beneficial to determine trustworthiness according to a particular application type that is relevant to a given V2X message.

Figure 4:
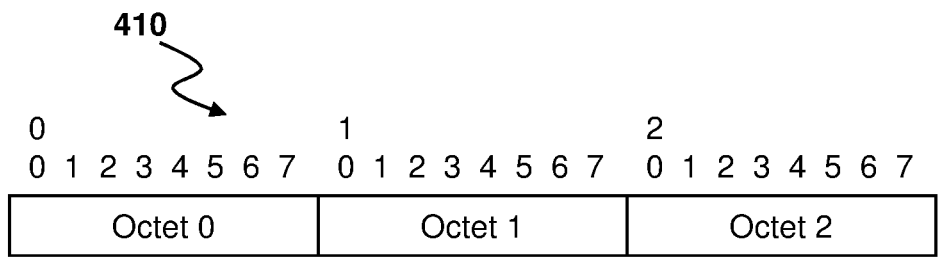
FIG. 4 is a block diagram showing signaling octets that may be used to convey function safety, a Safety of the Intended Function, or aggregated information.

Therefore, in accordance with this further embodiment, Assurance level information can be provided within the octets that are set aside for encoding SSP. Reference is now made to FIG. 4, which shows a format 410 for transmitted octets, where three octets are transmitted, namely octet 0, octet 1 and octets 2. These octets may be used for encoding functional safety, cybersecurity, and/or assurance levels as described below.

Octet Encoding for Functional Safety

With regard to functional safety, one example use for an application is the application "Road and Lane Topology (RLT)". This type of information can be sent or received by a vehicle, and may be important for a vehicle to trust that the sender is safety certified, since incorrect road topology may cause errors at other vehicles which are unable to determine such topology using their own sensors, but still need to use this information for maneuver planning. This application is however merely provided for illustration, and other applications are possible.

To encode the safety level without introducing new fields in the RLT message, four bits of a last octet of an already defined SSP octet string are set to signal the minimum safety certification, one for each of the automotive safety integrity levels (ASILs). If only ASIL A certification of the transmitting vehicle is achieved, then only bit 0 of the safety octet is set to 1 (i.e. 1,0,0,0), all others are set to 0. If ASIL D, then all first four bits are set to 1 (or alternatively the 4 bits could be set as 0,0,0,1).

For example, section 5.4.3.2 of ETSI TS draft 103 301 v.1.3.3 could be modified as shown with bold in Table 6 below:

TABLE 6

Octet Scheme for RLT Service SSPs

| Octet # | Description | Value |
|---|---|---|
| 0 | SSP version control | 1 |
| 1-2 | Service-specific parameter | See Table 7 |

The service parameters are defined in Table 7 below, with additions to this table shown in bold:

TABLE 7

RLT Service Communication Profile

| Octet Position | Bit Position | RLT service SSP data Item | Bit Value |
|---|---|---|---|
| 1 | 0 (80h) (MSBit) | Intersections geometry list allowed to transmit {MAPEM.map.intersections} | 0: certificate not allowed to sign 1: certificate allowed to sign |
| 1 | 1 (40h) | Road geometry list allowed to transmit {MAPEM.map.roadSegments} | 0: certificate not allowed to sign 1: certificate allowed to sign |
| 2 | 0 | Emitter is safety certified ASIL A | 0: certificate not allowed to sign 1: certificate allowed to sign |
| 2 | 1 | Emitter is safety certified ASIL B | 0: certificate not allowed to sign 1: certificate allowed to sign |
| 2 | 2 | Emitter is safety certified ASIL C | 0: certificate not allowed to sign 1: certificate allowed to sign |

TABLE 7-continued

RLT Service Communication Profile

| Octet Position | Bit Position | RLT service SSP data Item | Bit Value |
|---|---|---|---|
| 2 | 3 | Emitter is safety certified ASIL D | 0: certificate not allowed to sign 1: certificate allowed to sign |

If bits 0 to 3 of Octet position 2 are all zero, then the emitter shall be assumed not to be safety certified.
All other bits of the SSP are not used and set to 0.

The examples of Tables 6 and 7 are one possibility. However, other alternative encodings are possible. For example, the first two bits may be used to signal at a minimum safety level value via four values, 0, 1, 2 and 3, each meaning ASIL A, B, C or D respectively.

In a further alternative, spare bits within the first octet could be used for the same purpose.

Other options for encoding are possible.

Octet Encoding for Cybersecurity

With regard to cybersecurity, one example use for an application is the RLT application. This type of information can be sent or received by a vehicle. To encode the cybersecurity level without introducing new fields in the RLT message, four bits of a last octet of an already defined SSP octet string may be set to signal the minimum safety certification, one for each of the cybersecurity assurance levels as for example provided by ISO 21434 CALs, or ETSI defined TALs. In accordance with the embodiments the present disclosure, examples are provided with regard to CALs, but could equally be applicable to TALs.

If only CAL 1 certification of the transmitting vehicle is achieved, then only bit 0 of the cybersecurity octet is set to 1, all others are set to 0. If CAL 4 certification of the transmitting vehicle is achieved, then all first four bits are set to 1 (or alternatively the 4 bits could be set as 0,0,0,1).

Other alternate encodings are possible. For example, the first two bits signal the minimum cybersecurity level via four values of 0, 1, 2 and 3, each meaning CAL 1, 2, 3 or 4, respectively.

Other options are possible.

For example, section 5.4.3.2 of ETSI TS draft 103 301 v.1.3.3 could be modified as shown with bold in Table 8 below.

TABLE 8

Octet Scheme for RLT Service SSPs

| Octet # | Description | Value |
|---|---|---|
| 0 | SSP version control | 1 |
| 1-2 | Service-specific parameter | See Table 9 |

The service parameters are defined in Table 9 below, with additions to this table shown in bold:

TABLE 9

RLT Service Communication Profile

| Octet Position | Bit Position | RLT service SSP data Item | Bit Value |
|---|---|---|---|
| 1 | 0 (80h) (MSBit) | Intersections geometry list allowed to transmit {MAPEM.map.intersections} | 0: certificate not allowed to sign 1: certificate allowed to sign |
| 1 | 1 (40h) | Road geometry list allowed to transmit {MAPEM.map.roadSegments} | 0: certificate not allowed to sign 1: certificate allowed to sign |
| 2 | 0 | Emitter is cybersecurity certified CAL 1 | 0: certificate not allowed to sign 1: certificate allowed to sign |
| 2 | 1 | Emitter is cybersecurity certified CAL 2 | 0: certificate not allowed to sign 1: certificate allowed to sign |
| 2 | 2 | Emitter is cybersecurity certified CAL 3 | 0: certificate not allowed to sign 1: certificate allowed to sign |
| 2 | 3 | Emitter is cybersecurity certified CAL 4 | 0: certificate not allowed to sign 1: certificate allowed to sign |

If bits 0 to 3 of Octet position 2 are all zero, then the emitter shall be assumed not to be cybersecurity certified.
All other bits of the SSP are not used and set to 0.

For completeness, in Table 9 above where the ISO 21434 CAL is mentioned, this could alternatively be some other cybersecurity assurance level, including but not limited to the car2Car consortium TAL or the Common Criteria ISO 15408 EAL.

A similar approach could be taken for the encoding of SOTIF, although in this case only 2 values need to be encoded: 'accepted for release' or 'not accepted for release', for example.

Other options are possible Octet Encoding for a Set of Assurance Levels

The number of possible combinations that might need to be signaled if a breakdown of assurance level is provided for each of cybersecurity, FuSA, and SOTIF, is maximally 5×5×2=50. This therefore requires 6 bits in the most efficient possible coding. Specifically, there are 5 cybersecurity levels (TAL 0,1,2,3,4 or CAL 1,2,3,4) and 5 FuSa levels (QM, ASIL A, ASIL B, ASIL C, ASIL D) and 2 SOTIF levels ('proof of SOTIF related acceptance for release presented to CA', 'no proof of SOTIF related acceptance for release presented to CA').

However, it is possible to only support certain combinations of the three assurances, such that the total number of combined assurances is actually less than 50. For example, if it is agreed upon by industry participants that an application requires at least CAL 2, and at least ASIL B, and "proof" SOTIF level then this could rule out some possible combinations.

Based on the above, various encoding can be used to transmit the fusaAssuranceLevel and/or sotifAssuranceLevel. Reference is again made to FIG. 3.

Upon receipt of message 350, the ITS-S Sending Entity 310 can then send a V2X message, shown as SecuredMessage 360, to another ITS-S in the Intelligent Transportation System, such as ITS-S Receiving or Relaying Entity 312. The ITS-S Sending Entity 310, when wishing to send a V2X message, typically creates a V2X message that includes a certificate (Authorization Ticket) and a payload (e.g. vehicle current position, speed); computes a fixed length hash of the variable length V2X message, using a well-known hashing algorithm; signs the hash, using the ITS-S Sending Entity's private key; and appends the signature to the payload and sends the resulting V2X message. In this case, the Authorization Tickets include the new FuSa and/or SOTIF assurance level parameters as discussed above.

On receiving message 360, the ITS-S Receiving or Relaying Entity 312 will typically apply the Certificate Authority's well-known public key to the certificate's signature block to verify the identity of the sending entity and the public key of the sending entity.

The ITS-S Receiving or Relaying Entity 312 is preprogrammed with the FuSa (ASIL) levels that a designer of the receiving vehicle believes are necessary for a given application. As used herein, this level is designated as "demandedASILlevel".

Figure 5:
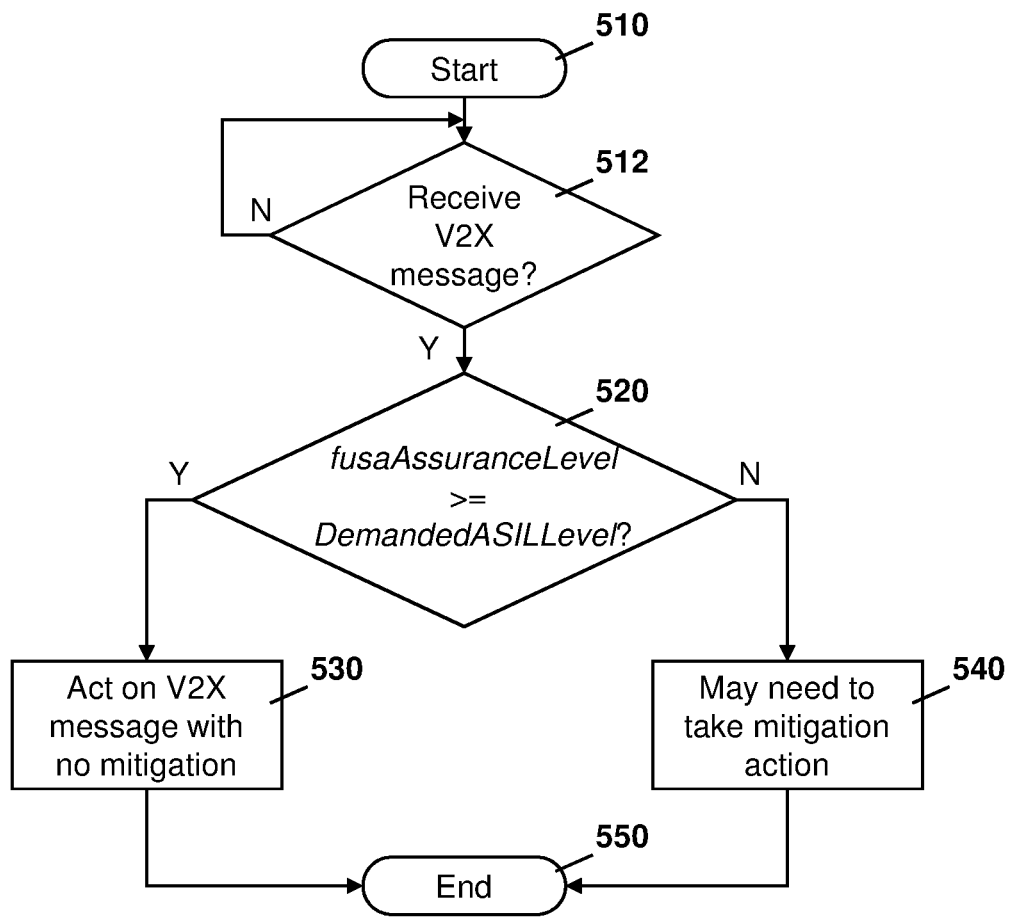
FIG. 5 is a process diagram showing a process at a receiving ITS Entity for determining how to react to a received V2X message based on functional safety assurance level information in the received V2X message.

Therefore, when receiving message 360, the ITS-S receiving or relaying entity 312 will check to determine whether the message meets the demandedASILlevel. Reference is now made to FIG. 5.

The process of FIG. 5 starts at block 510 and proceeds to block 512 in which the ITS-S Receiving or Relaying Entity 312 determines whether a V2X message has been received. If not, the process continues to loop to block 512 until a V2X message is received.

Once a V2X message is received, the process proceeds to block 520 in which a check is made to determine whether the fusaAssuranceLevel (ASIL) of the V2X transmitter (for example the ITS-S sending entity 310 as discovered from message 360) is greater than, or equal to, the receiving entity's demandedASILlevel.

If yes, the process proceeds from block 520 to block 530 in which the receiving V2X application can act on the V2X message contents without having to take any resulting mitigating action, at least from a FuSa perspective.

For example, if the V2X application is an Emergency Brake Warning application, then at block 530 there is trust in the message contents and brakes can be applied hard, even if this potentially could risk other, less serious accidents than would be the case if the brakes were not applied hard.

Conversely, if the check at block 520 determines that the fusaAssuranceLevel (ASIL) of the V2X transmitter is less than the receiving entity's demandedASILlevel, mitigating action may need to be taken, as shown at block 540.

For example, in the case of the Emergency Brake Warning application, there will be less trust in the message contents at block 540 than there would have been at block 530. In this case, brakes may still be applied more softly, pending further corroborating evidence such as visual evidence that a vehicle ahead has applied its brakes in an emergency manner.

In some cases, the larger the difference between a certified fusaAssuranceLevel and the demandedASILlevel, the more cautious the receiving entity may be in its reaction to the message, and hence the degree of reaction that can be made to the message may be lessened. For example, if there is a large difference between these two levels, then perhaps the vehicle will not apply any braking, but may instead precharge the brakes. For example, this may involve priming the hydraulic system and enabling augmentation of the force and speed with which the brakes are applied if and when a human driver or an autonomous robot does apply the brakes. Other options are possible.

From block 530 or block 540, the process proceeds to block 550 and ends.

Figure 6:
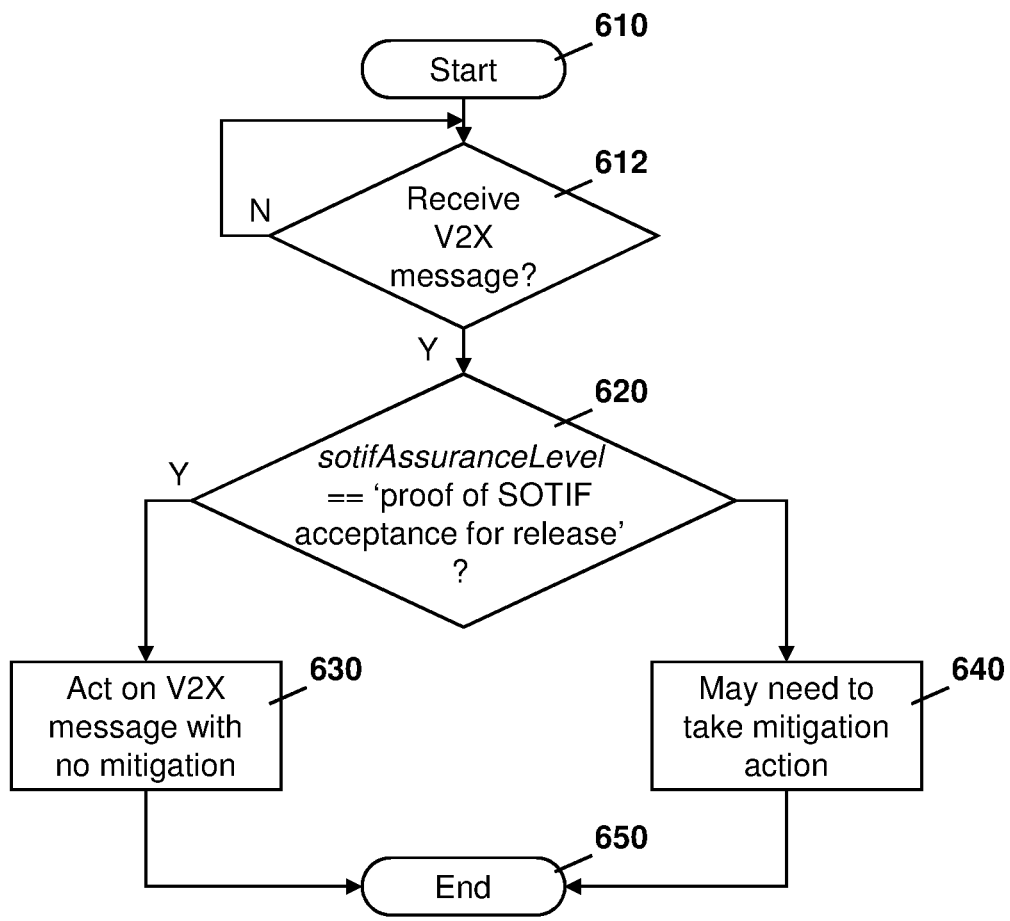
FIG. 6 is a process diagram showing a process at a receiving ITS Entity for determining how to react to a received V2X message based on Safety of the Intended Function assurance level information in the received V2X message.

Similarly, if the message 360 contains the sofitAssuranceLevel, then a receiving entity may check to determine whether this level is 'proof of SOTIF acceptance for release'. Reference is now made to FIG. 6.

The process of FIG. 6 starts at block 610 and proceeds to block 612 in which the ITS-S Receiving or Relaying Entity 312 determines whether a V2X message has been received. If not, the process continues to loop to block 612 until a V2X message is received.

Once a V2X message is received, the process proceeds to block 620 in which a check is made to determine whether the sofitAssuranceLevel is 'proof of SOTIF acceptance for release'. If yes, the process proceeds from block 620 to block 630 in which the receiving V2X application can act on the V2X message contents without having to take any resulting mitigating action. For example, with an Emergency Brake Warning application, there is trust in the received message contents and brakes may be applied hard, potentially even if this would risk causing another, less serious accident, than would be the case if the brakes were not applied hard.

Conversely, if the check at block 620 determines that the sofitAssuranceLevel is 'no proof of SOTIF acceptance for release' the process proceeds from block 620 to block 640 in which mitigating action may need to be taken. For example, with the Emergency Brake Warning application, there is less trust in the message contents. Brakes may be applied more softly, pending further corroborating evidence that a vehicle ahead has actually applied brakes in an emergency manner.

Figure 7:
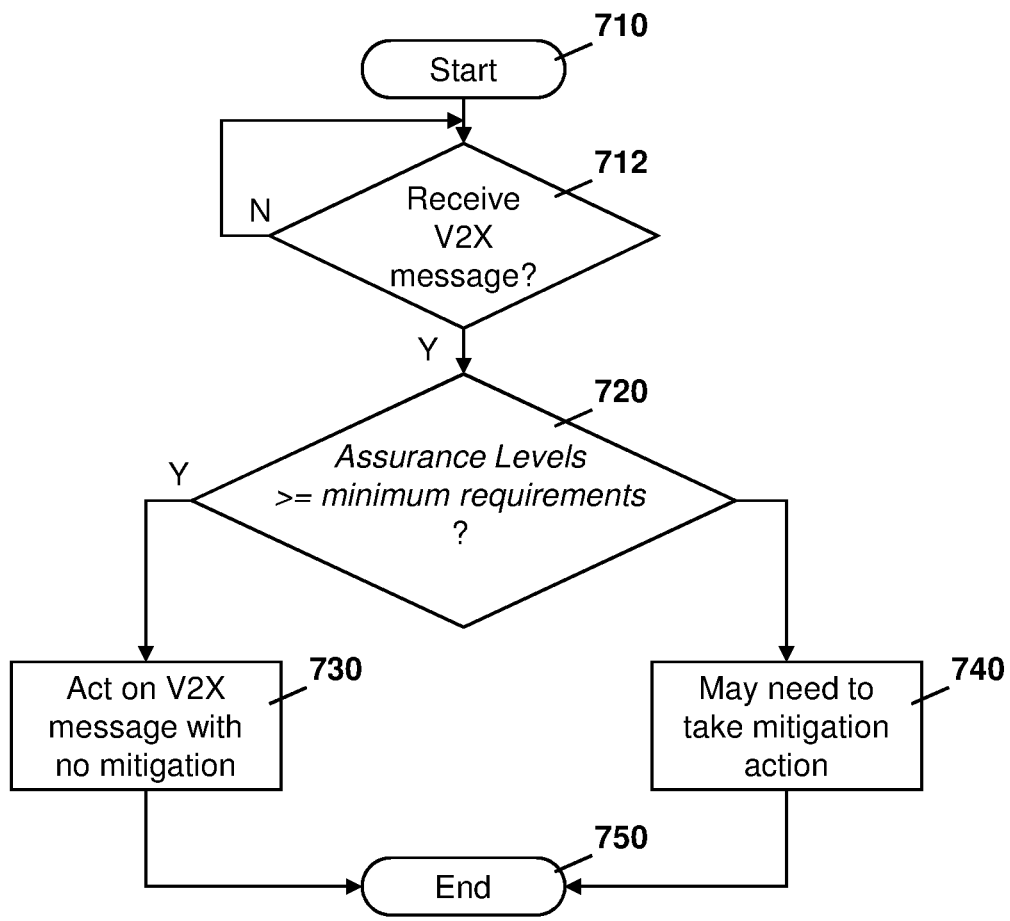
FIG. 7 is a process diagram showing a process at a receiving ITS Entity for determining how to react to a received V2X message based on a plurality of safety assurance level information in the received V2X message.

From block 630 or block 640, the process proceeds to block 650 and ends Further, if the message 360 contains a combination of assurance levels, such as a (cybersecurity) assuranceLevel, fusaAssuranceLevel and/or sotifAssuranceLevel, then a receiving entity may check to determine whether these levels meet minimum requirements. Reference is now made to FIG. 7.

The process of FIG. 7 starts at block 710 and proceeds to block 712 in which the ITS-S Receiving or Relaying Entity 312 determines whether a V2X message has been received. If not, the process continues to loop to block 712 until a V2X message is received.

Once a V2X message is received, the process proceeds to block 720 in which a check is made to determine whether all of assurance levels meet the minimum requirements as determined by a designer of the that the entity hosting the V2X receiver. For example, the minimum requirements may include that the SOTIF assurance level is "accepted for release", and the ASIL level exceeds a certain value and the cybersecurity level exceeds a certain value.

If yes, the process proceeds from block 720 to block 730 in which the receiving V2X application can act on the V2X message contents without having to take any resulting mitigating action. For example, with an Emergency Brake Warning application, there is trust in the received message contents and brakes may be applied hard, potentially even if this would risk causing another, less serious accident, than would be the case if the brakes were not applied hard.

Conversely, if the check at block 720 determines that minimum requirements of not been met, the process proceeds from block 720 to block 740 in which mitigating action may need to be taken. For example, with the emergency brake warning application, there is less trust in the message contents. Brakes may be applied more softly, pending further corroborating evidence that a vehicle ahead has actually applied brakes in an emergency manner.

The mitigating action at block 740 may depend on the degree that the minimum requirements are not met. For example, in one embodiment, the degree of mitigation action to be taken is the largest mitigating action out of any of those specified "inequality tests" as for example defined in FIGS. 5 and 6, fails, considering each for functional safety, SOTIF and cybersecurity.

In a further embodiment, if multiple tests fail, then the specified mitigating action is even greater than that specified for any of the individual test failures. For example, in one embodiment when an individual FuSa test or an individual SOTIF test fails, then the brakes may be applied more softly. However, if and when both the FuSa and SOTIF "inequality tests" fail, then the vehicle does not apply its brakes at all, but may perform a pre-charging of its brakes, where the pre-charging means that when a human driver or an autonomous machine eventually does apply the brake pedal, the braking can occur more quickly and with augmented force.

From block 730 or block 740, the process proceeds to block 750 and ends

Aggregated Assurance Level/Trust Level

In a further embodiment, instead of providing an assurance level breakdown in a message, such as message 360, for each of cybersecurity, FuSa and/or SOTIF, an Aggregated Assurance Level (AAL) may be provided.

One example of an aggregated assurance level is shown below with regard to Table 10.

TABLE 10

Example of possible Aggregated Assurance Level

All of the below must be true (ANDed) for a certificate to include a given AAL value (The EA/AA should include the highest possible AAL level in a certificate where multiple AAL levels could apply for a given V2X transmitting ITS-S)

| Aggregated Assurance Level (AAL) | Cybersecurity (TAL) | FuSa ASIL level | SOTIF level |
|---|---|---|---|
| 1 | 1 | A, B, C or D | No proof of 'accepted for release' or Proof of 'accepted for release' |
| 2 | 2, 3 or 4 | A | No proof of 'accepted for release' (or better) or Proof of 'accepted for release' |
| 3 | 2 | B, C or D | Proof of 'accepted for release' |
| 4 | 3 | B or C | Proof of 'accepted for release' |
| 5 | 3 | D | Proof of 'accepted for release' |
| 6 | 4 | B or C | Proof of 'accepted for release' |
| 7 | 4 | D | Proof of 'accepted for release' |

The example of Table 10 is however merely provided for illustration, and other similar aggregated table designs would be apparent to those skilled in the art having regard to the present disclosure. Therefore, the example of Table 10 is merely provided for illustration to show how a potentially larger set of combinations could be reduced to a smaller number of aggregated assurance levels.

In further embodiments, the AAL numbers from Table 10 could, instead, be associated with words indicating a level of trust, such as "low", "medium", "high", among others.

Utilizing such aggregated assurance levels, the certificate format presently defined in IEEE 1609.2 and the corresponding ETSI specifications could potentially stay the same, but with a redefinition of the meaning of assuranceLevel. In particular, the assuranceLevel could be associated with the aggregated assurance level rather than the cybersecurity (TAL) level currently used.

Specifically, in existing schemes, the assurance level that is to be associated with a given V2X module canonical ID is stored in a database that is accessible from the Enrollment Authority. In the embodiments described herein, the meaning of this assurance level would change.

The messaging associated with such change may be as follows. Reference is made to FIG. 2. When the Authorization Authority 216 sends an Authorization ValidationRequest message 232 to the Enrollment Authority 214, the Enrollment Authority 214 responds with an AuthorizationValidationResponse message 234 which includes the con firmedSubjectAttributes, one of which is the assuranceLevel now having a new meaning. It is this assuranceLevel that is provided in the Authorization Tickets which the Authorization Authority 216 provides to the IT S-S Sending Entity 210.

At the receiving entity, a decision needs to be made as to what action should be taken in light of the new given "trust level" or "aggregated assurance level". As used herein, the terms "trust level" and "aggregated assurance level" are used interchangeably and similar terminology could also be used.

Figure 8:
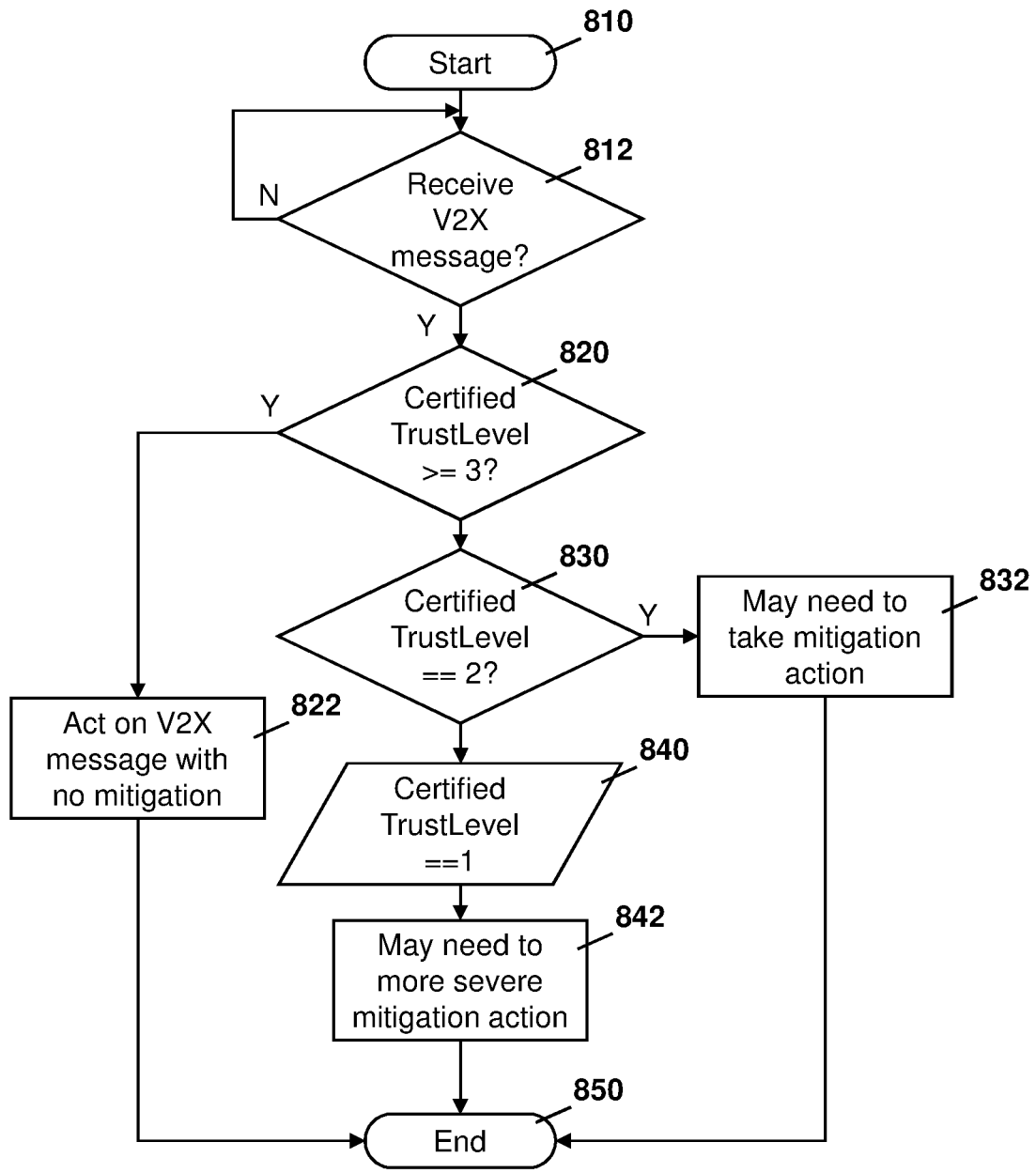
FIG. 8 is a process diagram showing a process at a receiving ITS Entity for determining how to react to a received V2X message based on aggregated safety assurance level information in the received V2X message.

Such decision based on the given trust level is illustrated with regard to FIG. 8, which shows the case of an Emergency Brake Warning application. However, the use of the Emergency Brake Warning application is merely provided as an example and other applications could similarly use of the aggregated assurance level or trust level.

The process of FIG. 8 starts at block 810 and proceeds to block 812 in which a receiving entity determines whether a V2X message has been received. If not, the process continues to loop to block 812 until a V2X message is received.

Once a V2X message is received, the process proceeds to block 820 in which a check is made to determine whether the certified trust level from the received message is greater than or equal to 3. If yes, the process may proceed from block 820 to block 822 in which the receiving V2X application can act on the V2X message contents without having to take any resulting mitigating action. In the example of the Emergency Brake Warning application, there is trust in the message contents and brakes can be applied hard, potentially even at the risk that this could cause other, less serious accidents, than would be the case if the brakes are not applied hard.

Conversely, if the certified trust level is not greater than or equal to 3, the process proceeds to block 830 in which a check is made to determine whether the certified trust level is equal to 2. If yes, the process proceeds to block 832 in which some mitigating action may be taken. For example, the brakes may be applied softly pending further corroboration such as visual evidence that a vehicle ahead has actually applied brakes in an emergency manner.

If the check at block 830 determines that the certified trust level is not equal to 2, then the process proceeds to block 840 in which the certified trust level must equal one. The process then proceeds to block 842 in which more severe mitigating action may be taken. For example, the vehicle will not apply any braking, but it may instead pre-charge the brakes. Pre-charging the brakes may include priming the hydraulic system and enabling augmentation of the force and speed with which the brakes are applied if and when a human driver or an autonomous robot does apply the brakes.

From block 822, 832 or 842, the process proceeds to block 850 and ends.

With regard to the encoding of the aggregated assurance level or trust level, all of the methods discussed above with regard to FIG. 3 or 4 could be applied to the encoding of the aggregated assurance level or trust level.

This includes redefining the meaning of the assurance level in the certificate in one embodiment.

In another embodiment, the encoding could include aggregated assurance levels or trust levels as items within an appPermissionsAndAssurance information element.

In a further embodiment, encoding the aggregated assurance level could include such items within an SSP information element, for example as described with regard to FIG. 4. Specifically, where an Aggregated Assurance Level or Trust Level approach is used instead then encoding for that information could also be performed within octets associated with SSP. Optionally the same encoding for Assurance Level(s) could be used for each possible PSID/SSP combination.

Dealing With Privacy Concerns

In some cases, privacy may be a concern with regard to the embodiments described above. Specifically, adding the FuSa level or SOTIF level to a certificate may reduce the privacy of the vehicle that transmits the V2X message. This problem that may be even more pronounced where there are distinguished values for different applications. This information, combined with other static or semi-static information in the messages, may provide a "fingerprint" that may be unique to a particular model of car and which may make the tracking of the vehicle easier.

In a first embodiment, one option to overcome the privacy concerns would be that twice as many authorization tickets/pseudonym certificates are issued to an ITS-S. A first set of the tickets has authorization levels while another set does not. In this case, the set with safety assurance levels is used when the message to be transmitted its warrants having such safety assurance levels. For example, when the V2X message is being used to support a road safety application or where safety could be impacted if the message contents are incorrect.

Where messages need to be sent that are not deemed to safety critical, then the certificates could be used that do not reveal this information about the transmitting vehicle. In this approach, a vehicle needs two sets of temporary certificates, which would increase the number of certificates of vehicle needs.

In this first embodiment, the safety assurance information may be provided when transmitting a Decentralized Environmental Notification Message (DENM) Emergency Brake Warning message. This type of message could have the potential for causing actuation in the vehicle that receives the message.

Conversely, the safety assurance information may be dispensed with four the periodic CAM/BSM messages which provide status updates, and which might be considered less safety critical.

In a further embodiment, the "aggregated assurance" level approach described with regard to Table 10 could have privacy benefits because there are less data elements in the vehicle's message fingerprint. In other words, if the only assurance information included in the message is that overall trust is high one selected from high medium or low, and the fingerprint contains very little detail and is difficult to distinguish between, or track vehicles based on, since the trust setting of "high" will be common to many vehicles.

Other assurance levels could be defined that apply for each application or use case and these too would have the effect of reducing the ability to track vehicles based on fingerprint since this assurance aspect of the fingerprint would be the same for all vehicles using the fingerprint. However, this approach has the disadvantage of requiring industry agreement, which may or may not happen and may cause delay based on the approach where the transmitter designer can make some independent decision on the assurance that will be provided while the receiver designer can also make some independent decision on how to process the message based on the assurance levels which is claimed by the transmitter.

Optionally, if a transmitting vehicle holds a higher assurance level than is minimally required by an application, as either determined by the transmitter designer or as determined by industry consensus in some industry association, then the certificate can contain a lower assurance level indication, where the motivation for doing so is to better protect privacy. Specifically, many or the majority of the vehicles would adopt to such a lower assurance level, causing the risk of unique "fingerprint" of the transmitting vehicle to be reduced.

Using the lower assurance level may also change the behavior of the Enrollment Authority and/or the Authorization Authority, so as to achieve the result that the Authorization Authority issues Authorization Tickets for a given assurance level that is reduced with respect to the V2X transmitter's certified assurance performance. Either the Enrollment Authority or the Authorization Authority can perform this reduction in assurance level.

SOTIF Assurance Provided in V2X Message Body

In yet a further embodiment, as an alternative to providing safety assurance information such as the FuSa and/or the SOTIF in the certificate, this information may be provided in the V2X message body.

Specifically, the V2X message body may be augmented with an information element that indicates the SOTIF level. For example, this may be a binary value taking one of the "safety of the intended functionality of the product is excepted for release by an independent audit CA" or that "safety of the intended functionality of the product has not been excepted for release by an independent audit CA".

In other examples, the V2X message body may be augmented with an information element that indicates an aggregated safety assurance level. In this case, the aggregation may be made across functional safety and SOTIF, for example.

In another example, the V2X message body may be augmented with an information element that indicates an aggregated cybersecurity and safety assurance. In this case, aggregation may be made across functional safety and SOTIF and cybersecurity. One example of such aggregation is shown below with regard to Table 11.

TABLE 11

Example of possible "Trust Level" definitions

| Trust level | Assurance certification requirements |
| --- | --- |
| 1 (Low) | FuSa ASIL level is A OR SOTIF is 'no proof of acceptance for release' |
| 2 (Medium) | ASIL level is between B and C AND SOTIF is 'accepted for release' |
| 3 (High) | ASIL level is D AND SOTIF is 'accepted for release' |

However, the example of Table 11 is provided merely for illustration purposes, and in other embodiments different definitions of such trust level are possible.

Hardware

A V2X Entity, V2X Client, Enrollment Authority, Certificate Authority, Authorization Authority, or a network server or node may be any type of computing device. For example, one simplified computing device that may perform the embodiments described above is provided with regards to FIG. 9.

Figure 9:
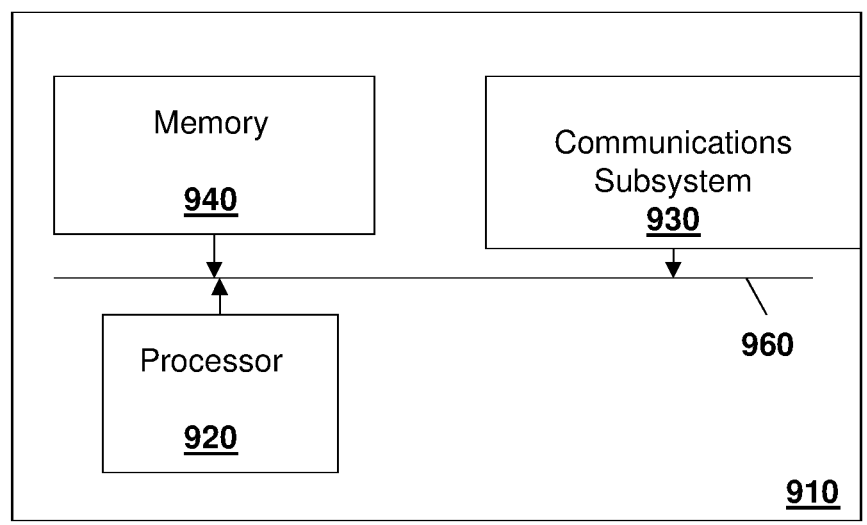
FIG. 9 is a block diagram of an example computing device or server capable of being used with the embodiments of the present disclosure.

In FIG. 9, computing device 910 includes a processor 920 and a communications subsystem 930, where the processor 920 and communications subsystem 930 cooperate to perform the methods of the embodiments described herein.

The processor 920 is configured to execute programmable logic, which may be stored, along with data, on the computing device 910, and is shown in the example of FIG. 9 as memory 940. The memory 940 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 920 may also be implemented entirely in hardware and not require any stored program to execute logic functions.

Alternatively, or in addition to the memory 940, the computing device 910 may access data or programmable logic from an external storage medium, for example through the communications subsystem 930.

The communications subsystem 930 allows the computing device 910 to communicate with other devices or network elements.

Communications between the various elements of the computing device 910 may be through an internal bus 960 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at an Intelligent Transportation System (ITS) Entity, the method comprising:
   receiving a message from a second ITS entity, the message containing a safety assurance indication regarding at least one of a functional safety of a transmitter of the second ITS entity and a safety of an intended functionality of the second ITS entity within an Authorization Ticket or Authorization certificate issued by an Authorization Authority, the safety assurance indication providing that at least one of hardware and software at the second ITS entity causing the message to be generated is certified to an indicated value; and performing an action at the ITS entity based on requirements of an application at the ITS entity using information from the message and the indicated value within the safety assurance indication.

2. The method of claim 1, wherein the safety assurance indication is at least one of a functional safety assurance level indication and a Safety of the Intended Functionality assurance level indication.

3. The method of claim 1, wherein:
when the safety assurance indication is regarding the functional safety of the transmitter of the second entity, the safety assurance indication is an aggregation of a functional safety assurance level indication and at least one of; a Safety of the Intended Function assurance level indication; and a cybersecurity assurance level indication; and when the safety assurance indication is regarding the safety of the intended functionality of the second ITS entity, the safety assurance indication is an aggregation of a Safety of the Intended Function assurance level indication and at least one of: the functional safety assurance level indication and a cybersecurity assurance level indication.

4. The method of claim 1, wherein the Authorization Ticket is issued by the Authorization Authority based on an independent third party verifying the safety assurance indication.

5. The method of claim 1, wherein the safety assurance indication is associated with a specific application or service.

6. The method of claim 1, wherein the safety assurance indication is encoded in octets for Service Specific Permissions (SSPs).

7. The method of claim 1, wherein the message is one of a plurality of messages received at the ITS entity, wherein only messages conveying safety information include the safety assurance indication.

8. The method of claim 1, wherein the performing the action comprises:
responding at the ITS entity to the message when the safety assurance indication is at or above a minimum threshold level; and mitigating a response at the ITS entity to the message when the safety assurance indication is below the minimum threshold level.

9. The method of claim 8, wherein the message contains a plurality of safety assurance indications, and wherein a degree for the mitigating the response is dependent on a number of safety assurance indications below the minimum threshold level.

10. An Intelligent Transportation System (ITS) Entity, the ITS Entity comprising:
a processor; and
a communications subsystem,
wherein the ITS Entity is configured to:
receive a message using the communications subsystem from a second ITS entity, the message containing a safety assurance indication regarding at least one of a functional safety of a transmitter of the second ITS entity and a safety of an intended functionality of the second ITS entity within an Authorization Ticket or Authorization certificate issued by an Authorization Authority, the safety assurance indication providing that at least one of hardware and software at the second ITS entity causing the message to be generated is certified to an indicated value; and perform, using the processor, an action at the ITS entity based on requirements of an application at the ITS entity using information from the message and the indicated value within the safety assurance indication.

11. The ITS Entity of claim 10, wherein the Authorization Ticket is issued by the Authorization Authority based on an independent third party verifying the safety assurance indication.

12. The ITS Entity of claim 10, wherein the safety assurance indication is at least one of a functional safety assurance level indication and a Safety of the Intended Functionality assurance level indication.

13. The ITS Entity of claim 10, wherein:
when the safety assurance indication is regarding the functional safety of the transmitter of the second entity, the safety assurance indication is an aggregation of a functional safety assurance level indication and at least one of; a Safety of the Intended Function assurance level indication; and a cybersecurity assurance level indication; and when the safety assurance indication is regarding the safety of the intended functionality of the second ITS entity, the safety assurance indication is an aggregation of a Safety of the Intended Function assurance level indication and at least one of: the functional safety assurance level indication and a cybersecurity assurance level indication.

14. The ITS Entity of claim 10, wherein the safety assurance indication is associated with a specific application or service.

15. The ITS Entity of claim 10, wherein the safety assurance indication is encoded in octets for Service Specific Permissions (SSPs).

16. The ITS Entity of claim 10, wherein the message is one of a plurality of messages received at the ITS entity, wherein only messages conveying safety information include the safety assurance indication.

17. The ITS Entity of claim 10, wherein the ITS Entity is configured to perform action by:
responding at the ITS entity to the message when the safety assurance indication is at or above a minimum threshold level; and mitigating a response at the ITS entity to the message when the safety assurance indication is below the minimum threshold level.

18. The ITS Entity of claim 17, wherein the message contains a plurality of safety assurance indications, and wherein a degree for the mitigating the response is dependent on a number of safety assurance indications below the minimum threshold level.

19. A non-transitory computer readable medium for storing instruction code, which, when executed by a processor of an Intelligent Transportation System (ITS) Entity, cause the ITS Entity to:
receive a message from a second ITS entity, the message containing a safety assurance indication regarding at least one of a functional safety of a transmitter of the Second ITS entity and a safety of an intended functionality of the second ITS entity within an Authorization Ticket or Authorization certificate issued by an Authorization Authority, the safety assurance indication providing that at least one of hardware and software at the second ITS entity causing the message to be generated is certified to an indicated value; and perform an action at the ITS entity based on requirements of an application at the ITS entity using information from the message and indicated value within the safety assurance indication.

\* \* \* \* \*